(12) United States Patent
Jenkins, Jr. et al.

(10) Patent No.: US 7,568,357 B2
(45) Date of Patent: Aug. 4, 2009

(54) FREEZE TOLERANT WATERLINE VALVE FOR A REFRIGERATOR

(75) Inventors: James H. Jenkins, Jr., South Amana, IA (US); Thomas C. Anell, Knoxville, IL (US)

(73) Assignee: Maytag Corporation, Benton Harbor, MI (US)

( * ) Notice: Subject to any disclaimer, the term of this patent is extended or adjusted under 35 U.S.C. 154(b) by 491 days.

(21) Appl. No.: 11/329,569

(22) Filed: Jan. 11, 2006

(65) Prior Publication Data

US 2006/0260342 A1 Nov. 23, 2006

Related U.S. Application Data

(63) Continuation-in-part of application No. 11/139,237, filed on May 27, 2005, now Pat. No. 7,337,620, and a continuation-in-part of application No. 11/131,701, filed on May 18, 2005, now Pat. No. 7,284,390.

(51) Int. Cl.
*F25D 23/12* (2006.01)

(52) U.S. Cl. .................. 62/98; 62/339; 138/27

(58) Field of Classification Search ........... 62/338–339, 62/98; 138/27
See application file for complete search history.

(56) References Cited

U.S. PATENT DOCUMENTS

| | | |
|---|---|---|
| 2,139,441 A | 12/1938 | Clarke |
| 2,223,947 A | 12/1940 | Blood et al. |
| 2,256,551 A | 9/1941 | Colvin |
| 2,400,634 A | 5/1946 | Earle |
| 2,410,334 A | 10/1946 | Brace |
| 2,493,488 A | 1/1950 | Jordan et al. |
| 2,544,394 A | 3/1951 | Muffly |
| 2,605,621 A | 8/1952 | Kellershon |
| 2,717,505 A | 9/1955 | Andersson |
| 2,765,633 A | 10/1956 | Muffly |
| 2,774,224 A | 12/1956 | Bayston |
| 2,779,165 A | 1/1957 | Pichler |
| 2,795,117 A | 6/1957 | Herndon, Jr. et al. |
| 2,907,180 A | 10/1959 | Mann |

(Continued)

FOREIGN PATENT DOCUMENTS

| | | |
|---|---|---|
| EP | 657706 A1 | 6/1995 |
| EP | 1 445 558 | 11/2003 |
| EP | 1 482 263 A2 | 1/2004 |
| EP | 482 263 | 1/2004 |
| EP | 1 517 103 A2 | 3/2005 |

(Continued)

OTHER PUBLICATIONS

Adamski, Joseph R., U.S. Appl. No. 11/236,126, filed Sep. 27, 2005, Apparatus and Method for Dispensing Ice From a Bottom Mount Refrigerator.

(Continued)

*Primary Examiner*—William E Tapolcai
(74) *Attorney, Agent, or Firm*—Kirk W. Goodwin; McKee, Voorhees & Sease PLC

(57) ABSTRACT

An improved refrigerator is provided with a freeze tolerant valve for the water tank assembly in the refrigerator. The valve includes a body with an internal plastic spool which minimizes the volume of water within the valve, and which provides a space in the valve to accommodate freezing water in the valve. The valve will not crack or fail in the event of a temperature control problem in the refrigerator which results in frozen water within the valve.

10 Claims, 5 Drawing Sheets

U.S. PATENT DOCUMENTS

| | | |
|---|---|---|
| 3,046,754 A | 7/1962 | Kniffin |
| 3,100,970 A | 8/1963 | Elfving |
| 3,126,714 A | 3/1964 | Zuercher, Jr. |
| 3,146,601 A | 9/1964 | Gould |
| 3,146,606 A | 9/1964 | Grimes |
| 3,182,464 A | 5/1965 | Archer |
| 3,192,726 A | 7/1965 | Newton |
| 3,225,559 A | 12/1965 | Fischer |
| 3,226,939 A | 1/1966 | Harbison |
| 3,270,519 A | 9/1966 | Pohl, Jr. |
| 3,308,631 A | 3/1967 | Kniffin |
| 3,382,682 A | 5/1968 | Frohbieter |
| 3,440,308 A | 4/1969 | Carbary et al. |
| 3,541,806 A | 11/1970 | Jacobs |
| 3,581,516 A | 6/1971 | Buchser |
| 3,602,007 A | 8/1971 | Drieci |
| 3,633,374 A | 1/1972 | Canter |
| 3,654,772 A | 4/1972 | Curry, III |
| 3,745,779 A | 7/1973 | Bright |
| 3,747,363 A | 7/1973 | Grimm |
| 3,775,994 A | 12/1973 | Linstromberg |
| 3,788,089 A | 1/1974 | Graves |
| 3,789,620 A | 2/1974 | Benasutti |
| 3,821,881 A | 7/1974 | Harkias |
| 3,834,177 A | 9/1974 | Scarlett |
| 3,850,008 A | 11/1974 | Frazier |
| 3,866,434 A | 2/1975 | Pugh |
| 3,889,888 A | 6/1975 | Prada |
| 4,003,214 A | 1/1977 | Schumacher |
| 4,007,600 A | 2/1977 | Simms |
| 4,020,644 A | 5/1977 | True, Jr. |
| 4,100,761 A | 7/1978 | Linstromberg |
| 4,118,451 A | 10/1978 | Schaus |
| 4,142,373 A | 3/1979 | Weibel |
| 4,142,377 A | 3/1979 | Fogt |
| 4,142,378 A | 3/1979 | Bright |
| 4,227,383 A | 10/1980 | Horvay |
| 4,250,923 A | 2/1981 | Johnson |
| 4,280,682 A | 7/1981 | Zukausky |
| 4,285,212 A | 8/1981 | Prada |
| 4,306,757 A | 12/1981 | Horvay |
| 4,332,146 A | 6/1982 | Yamazaki |
| 4,487,024 A | 12/1984 | Fletcher et al. |
| 4,543,800 A * | 10/1985 | Mawby et al. ................ 62/339 |
| 4,587,810 A | 5/1986 | Fletcher |
| 4,614,088 A | 9/1986 | Brooks |
| 4,644,753 A | 2/1987 | Burke |
| 4,727,720 A | 3/1988 | Wernicki |
| 4,754,615 A | 7/1988 | Linstromberg |
| 4,756,165 A | 7/1988 | Chestnut et al. |
| 4,799,362 A | 1/1989 | Chestnut |
| 4,831,840 A | 5/1989 | Fletcher |
| 4,872,317 A | 10/1989 | Reed |
| 4,889,316 A | 12/1989 | Donahue, Jr. |
| 4,916,921 A | 4/1990 | Fletcher |
| 4,922,725 A | 5/1990 | Rasmussen |
| 4,961,320 A | 10/1990 | Gutmann |
| 5,010,738 A | 4/1991 | Brown |
| 5,033,636 A | 7/1991 | Jenkins |
| 5,058,627 A * | 10/1991 | Brannen ..................... 138/27 |
| 5,090,208 A | 2/1992 | Aono et al. |
| 5,117,869 A * | 6/1992 | Kolchinsky ............ 137/625.65 |
| RE34,174 E | 2/1993 | Brown |
| 5,198,244 A | 3/1993 | Rice |
| 5,211,462 A | 5/1993 | Bien |
| 5,219,225 A | 6/1993 | Ball |
| 5,261,248 A | 11/1993 | Willis |
| 5,272,888 A | 12/1993 | Fisher |
| 5,273,219 A | 12/1993 | Beach |
| 5,310,090 A | 5/1994 | Taylor |
| 5,327,856 A | 7/1994 | Schroeder |
| 5,357,769 A | 10/1994 | Crabtree et al. |
| 5,375,432 A | 12/1994 | Cur |
| 5,596,182 A | 1/1997 | Edwards |
| 5,642,628 A | 7/1997 | Whipple, III et al. |
| 5,711,159 A | 1/1998 | Whipple, III |
| 5,758,512 A | 6/1998 | Peterson et al. |
| 5,787,723 A | 8/1998 | Mueller et al. |
| 5,810,331 A | 9/1998 | Smock |
| 5,823,001 A | 10/1998 | Patrick |
| 5,829,263 A | 11/1998 | Park |
| 5,834,126 A | 11/1998 | Sheu |
| 5,846,446 A | 12/1998 | Jackson |
| 5,849,227 A | 12/1998 | Chikugo et al. |
| 5,899,083 A | 5/1999 | Peterson et al. |
| 6,019,447 A | 2/2000 | Jackovin |
| 6,050,097 A | 4/2000 | Nelson |
| 6,053,472 A | 4/2000 | DeLand |
| 6,055,826 A | 5/2000 | Hiraoka et al. |
| 6,062,826 A | 5/2000 | Morimoto |
| 6,082,130 A | 7/2000 | Pastryk |
| 6,090,281 A | 7/2000 | Buckner |
| 6,091,062 A | 7/2000 | Pfahnl et al. |
| 6,148,624 A | 11/2000 | Bishop |
| 6,286,324 B1 | 9/2001 | Pastryk |
| 6,312,608 B1 | 11/2001 | Buckner |
| 6,314,745 B1 | 11/2001 | Janke |
| 6,351,955 B1 | 3/2002 | Oltman et al. |
| 6,351,958 B1 | 3/2002 | Pastryk |
| 6,351,967 B1 | 3/2002 | Adachi |
| 6,401,461 B1 | 6/2002 | Harrison et al. |
| 6,412,286 B1 | 7/2002 | Park et al. |
| 6,422,031 B1 | 7/2002 | Mandel et al. |
| 6,425,425 B2 | 7/2002 | Bianchi et al. |
| 6,438,988 B1 | 8/2002 | Paskey |
| 6,464,854 B2 | 10/2002 | Andrews et al. |
| 6,474,094 B2 | 11/2002 | Kim |
| 6,604,377 B2 | 8/2003 | Watanabe et al. |
| 6,612,116 B2 | 9/2003 | Fu et al. |
| 6,694,754 B1 | 2/2004 | Schenk |
| 6,708,726 B2 | 3/2004 | Hashimoto |
| 6,725,680 B1 | 4/2004 | Schenk |
| 6,732,537 B1 | 5/2004 | Anell et al. |
| 6,735,959 B1 | 5/2004 | Najewicz |
| 6,755,166 B2 | 6/2004 | Chang |
| 6,805,154 B1 * | 10/2004 | Dickey et al. ............... 137/360 |
| 6,820,433 B2 | 11/2004 | Hwang |
| 6,845,631 B1 | 1/2005 | Hallin et al. |
| 6,880,355 B2 | 4/2005 | Jung |
| 6,964,177 B2 | 11/2005 | Lee et al. |
| 7,065,975 B2 | 6/2006 | Herndon et al. |
| 7,076,967 B2 | 7/2006 | Lee et al. |
| 7,194,872 B2 * | 3/2007 | Kim et al. ..................... 62/338 |
| 7,278,625 B2 * | 10/2007 | Huber et al. ................ 251/356 |
| 7,287,397 B2 * | 10/2007 | Coulter et al. ................ 62/338 |
| 2002/0121096 A1 | 9/2002 | Harrison et al. |
| 2002/0124576 A1 | 9/2002 | Loibl et al. |
| 2003/0010056 A1 | 1/2003 | Sakamoto et al. |
| 2003/0046947 A1 | 3/2003 | Ohya et al. |
| 2004/0148957 A1 | 8/2004 | Pohl |
| 2004/0237565 A1 | 12/2004 | Lee et al. |
| 2005/0061016 A1 | 3/2005 | Lee et al. |
| 2006/0090496 A1 | 5/2006 | Adamski et al. |

FOREIGN PATENT DOCUMENTS

| | | |
|---|---|---|
| EP | 1 519 131 A1 | 3/2005 |
| GB | 2 167 544 | 10/1985 |
| GB | 2 242 731 A | 10/1991 |
| JP | 500 69644 | 6/1975 |
| JP | 0356113417 A | 9/1981 |
| JP | 2002228316 | 8/2002 |
| WO | WO 03/102481 A1 | 12/2003 |

WO  WO 2004/085937 A1  10/2004

OTHER PUBLICATIONS

Anderson, Ronald K., U.S. Appl. No. 11/140,100, filed May 27, 2005, Refrigerator With Improved Icemaker.

Brain, Marshall "How Refrigerators Work" http://home.howstuffworks.com/refrigerator.htm/printable 6 pages, Feb. 4, 2005.

Coulter, Tim, U.S. Appl. No. 11/139,237, filed May 27, 2005, Insulated Ice Compartment for Bottom Mount Refrigerator.

* cited by examiner

FREEZE TOLERANT WATERLINE VALVE FOR A REFRIGERATOR

CROSS-REFERENCE TO RELATED APPLICATIONS

This application is a continuation-in-part application of U.S. application Ser. No. 11/139,237 filed on May 27, 2005, which was a continuation-in-part of U.S. application Ser. No. 11/131,701 filed May 18, 2005.

BACKGROUND OF THE INVENTION

Ice and water dispensers are common in household refrigerators. Typically, the water system components, such as a tank, valves, a filter and tubing are located in the refrigerator throughout the cabinet and base pan areas. This arrangement is prone to service calls to repair leaks and water restrictions due to the large number of connections or fittings for the components. The multiple connections in various tubing lengths also adds to the manufacturing costs. Also, while the water system components are not intended to be subjected to freezing temperatures, refrigeration control problems can cause freezing temperatures to occur which can lead to further problems. For example, if the water inside the valve freezes, the frozen water expansion will cause the valve to crack. Then, when the freezing temperature is eliminated, the frozen water will thaw and leak from the valve.

Therefore, a primary objective of the present invention is the provision of an improved valve for the waterline in a refrigerator.

Another objective of the present invention is the provision of a freeze tolerant waterline valve for a refrigerator.

Still another objective of the present invention is the provision of a method of preventing failure of a valve in a refrigerator waterline due to freezing temperatures.

Yet another objective of the present invention is the provision of a refrigerator waterline valve having a spool in the inlet barrel of the valve to displace water out of the barrel upon freezing.

Another objective of the present invention is the provision of a refrigerator waterline valve having an air space within the valve body so as to accommodate expansion of freezing water in the valve.

A further objective of the present invention is the provision of an improved valve for a refrigerator waterline that does not subject the body of the valve to the direct mechanical force of expanding ice.

A further objective of the present invention is the provision of an improved valve for a refrigerator waterline which is economical to manufacture and durable in use.

These and other objectives will become apparent from the following description of the invention.

BRIEF SUMMARY OF THE INVENTION

The refrigerator of the present invention includes a water tank for storing water, with a water inlet line and a water outlet line. The improved valve of the invention is placed in the outlet line to control flow of water from the tank to the icemaker and/or water dispenser. The valve has a body or barrel in which a plastic spool is mounted. The spool has a passageway there through with a diameter approximately the same as the diameter of the waterline, so as to minimize the volume of water within the valve. If a control problem arises in the refrigerator which reduces the temperatures below freezing, the water in the spool will freeze and expand, but the plastic spool will absorb the expansion forces of the freezing water so as to prevent cracking and failure of the valve. The spool geometry also provides air space within the valve body to accommodate expansion of freezing water without subjecting the body of the valve to the mechanical force of the expanding ice.

DETAILED DESCRIPTION OF THE PREFERRED EMBODIMENT

Figure 1:
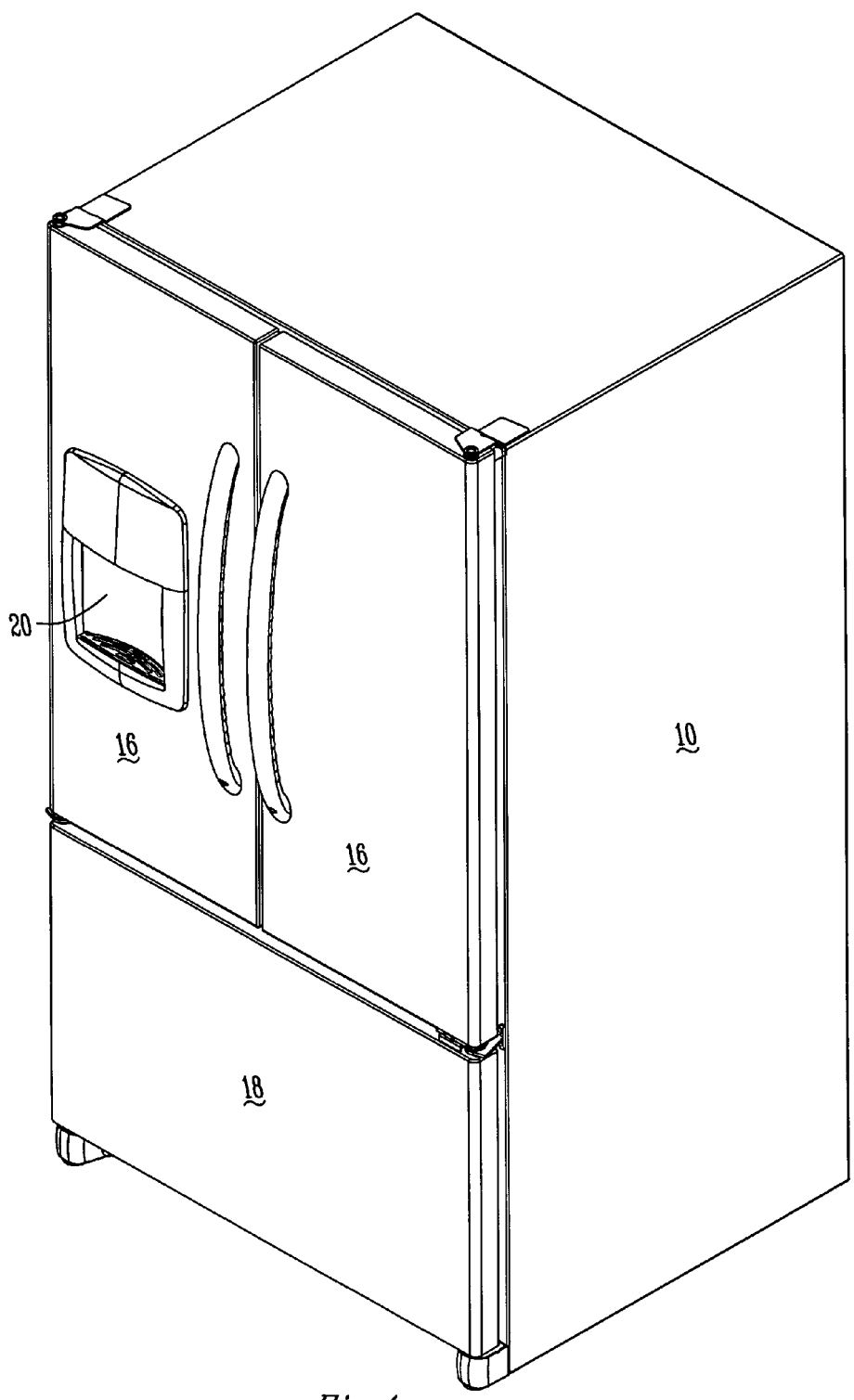
FIG. 1 is a perspective view of a bottom mount refrigerator having the waterline valve of the present invention.
Figure 2:
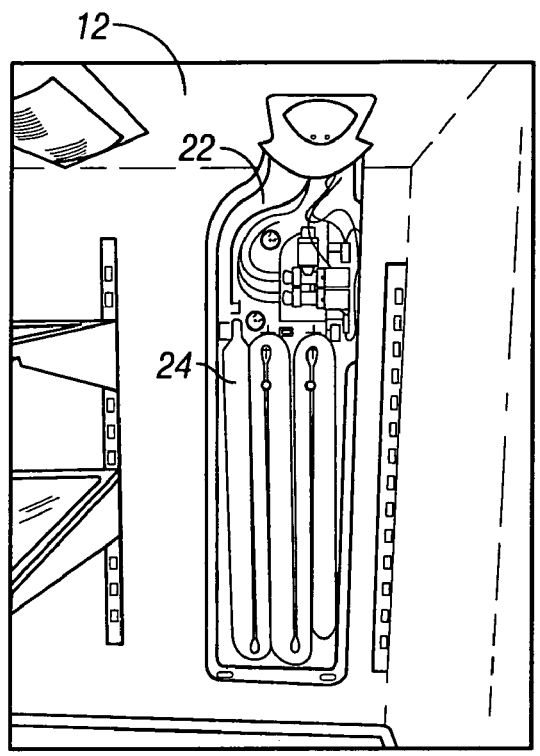
FIG. 2 is a front view of the fresh food compartment of the refrigerator showing a cover for the water tank assembly.
Figure 3:
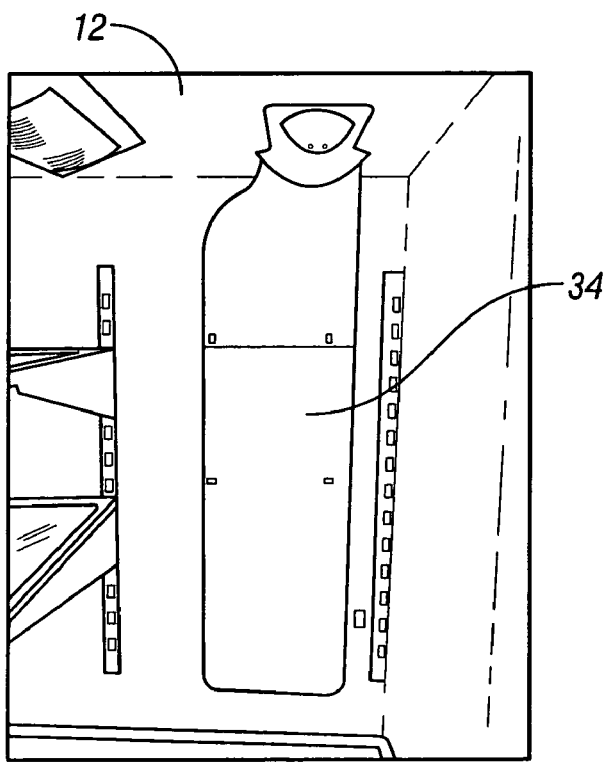
FIG. 3 is a front view of the water tank assembly residing within the cavity in the rear wall of the fresh food compartment, with the cover removed.
Figure 4:
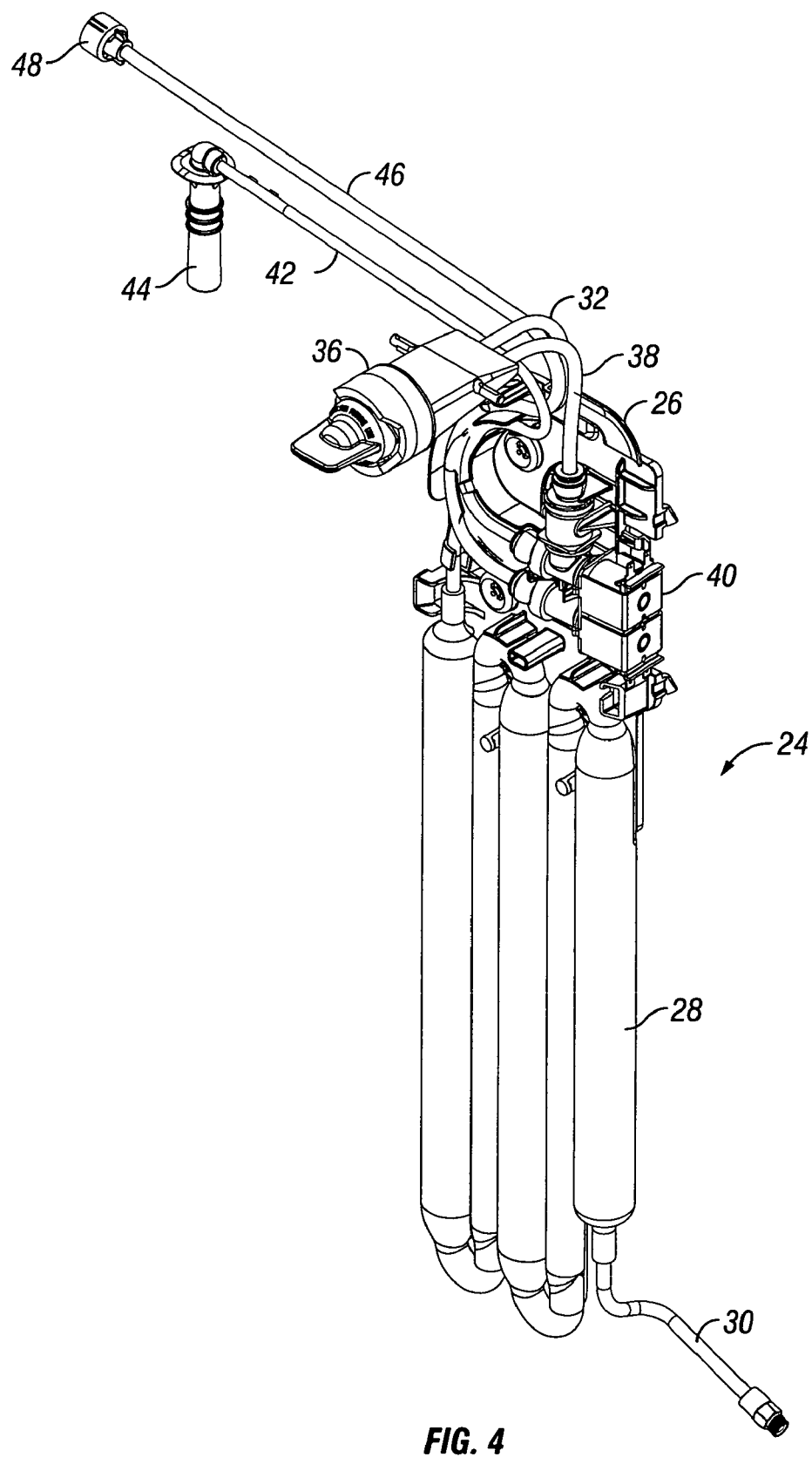
FIG. 4 is a perspective view of the water tank assembly, with the valve of the present invention.
Figure 5:
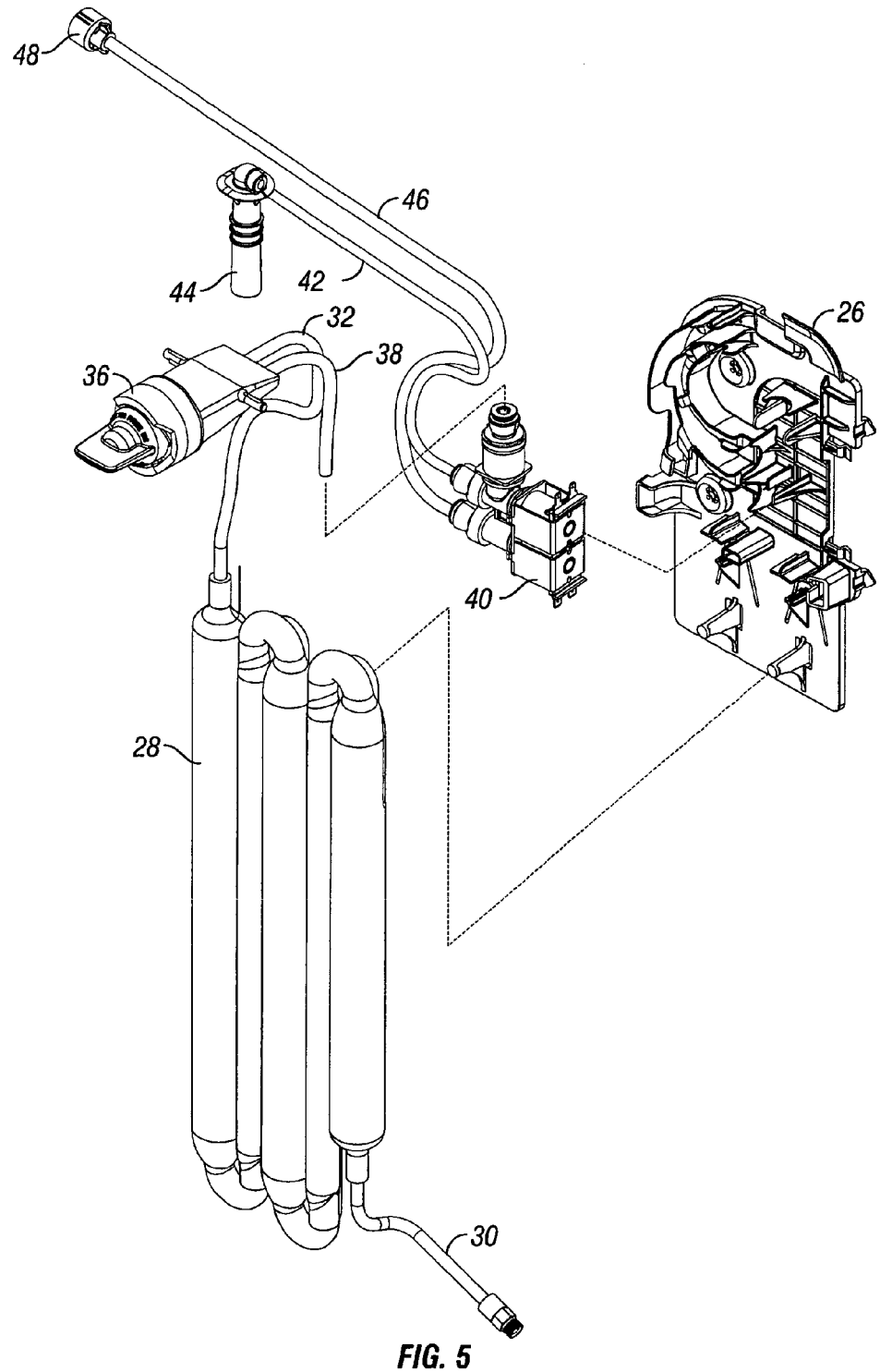
FIG. 5 is an exploded view of the water tank assembly.
Figure 6:
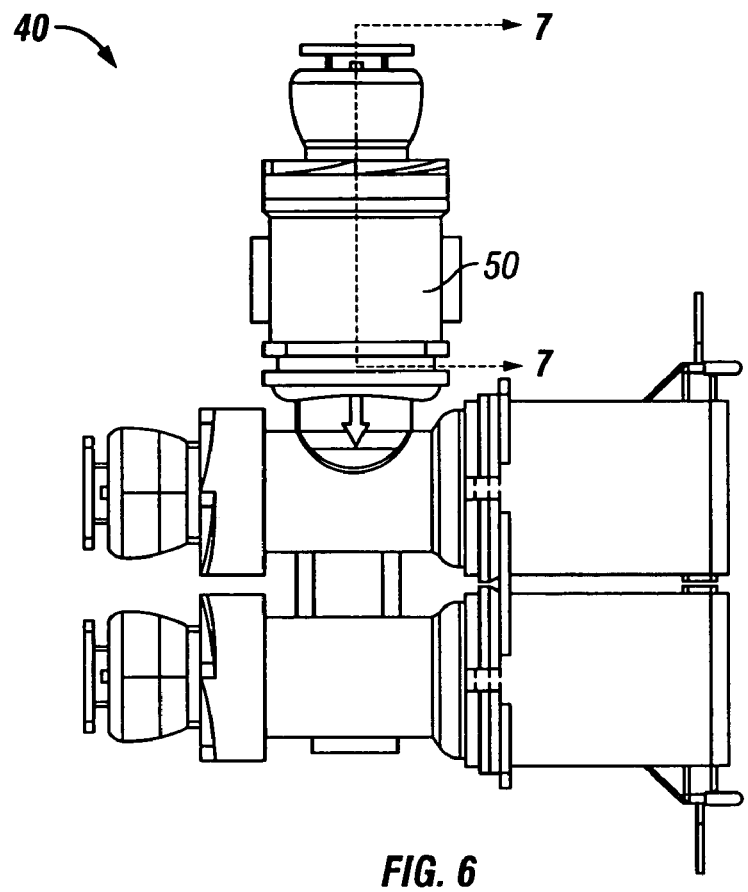
FIG. 6 is a front elevation view of the freeze tolerant waterline valve of the present invention.
Figure 7:
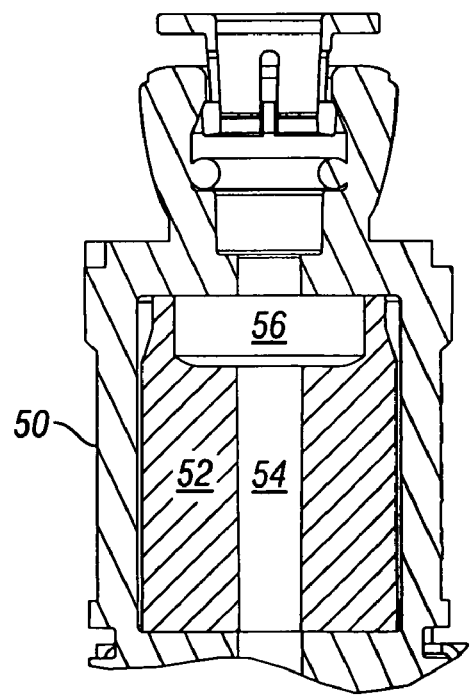
FIG. 7 is a sectional view of the valve taken along lines 7-7 of FIG. 6.

The present invention is directed towards a freeze-tolerant waterline valve for a refrigerator. The valve may be used in any refrigerator having an ice and/or water dispenser, including a bottom mount refrigerator, a top mount refrigerator, or a side-by-side refrigerator.

In the drawings, a bottom mount refrigerator is generally designated by the reference numeral 10. The refrigerator 10 includes a fresh food compartment 12 and a freezer compartment 14. Doors 16 are provided for the fresh food compartment 12 and a door 18 is provided for the freezer compartment. An ice and/or water dispenser 20 is provided in one of the doors 16.

The fresh food compartment 12 includes a recess or cavity 22 in the rear wall adapted to receive a water valve and tank assembly 24. The assembly 24 includes a mounting bracket 26 which is secured in the recess 22 in the back wall of the fresh food compartment 12 in any convenient manner. A water tank 28 is mounted on the bracket 26 and includes a water inlet line 30 and a water outlet line 32. A cover 34 attaches to the rear wall of the fresh food compartment 12 so as to hide the water tank 28 from view when the door 16 of the fresh food compartment 12 is opened. The water system 24 is pre-assembled in a single module that can be quickly and easily installed. The module 24 has less tubing runs and connections between components as compared to prior art water systems.

The water inlet line 30 is connected to a conventional water supply line. The water outlet line 32 is operatively connected to a filter 36. Preferably, the filter 36 is pivotally mounted in the ceiling of the fresh food compartment 12, as disclosed in Applicant's co-pending application Ser. No. 10/195,659, entitled HINGE DOWN REFRIGERATOR WATER FILTER, filed Jul. 15, 2002, which is incorporated herein by reference.

The water filter 32 has an outlet line 38 which is connected to a water solenoid valve 40 mounted on the bracket 26. The valve 40 has a first outlet line 42 leading to the icemaker fill tube 44 and a second outlet line 46 leading to the water dispenser of the refrigerator 10. Line 46 has a fitting 48 which provides a quick connection with a simple ¼ turn, without threads, to the water dispenser line in the door 16.

In prior art refrigerators, the water tank is normally located downstream of the water valve and filter, so as to prevent subjecting the water tank to inlet water supply pressures. In this invention, the tank 28 is designed to withstand inlet water supply pressures. The location of the tank 28 in the recess 22 allows greater fresh food storage capacity. Also, the location of the tank 28 upstream from the filter 36 and the valve 40 will reduce the service call rate. The downstream location of the filter 36 also removes plastic tastes associated with the plastic tank 28, and allows chlorinated water to be stored in the tank 28, which reduces microbiological growth on the interior of the water tank 28.

The valve 40 includes a body or barrel 50 in which a flexible, plastic spool 52 is received. The spool 52 includes a longitudinal passage 54 having a diameter substantially equal to the diameter of the waterline 38. The spool 52 substantially fills the volume of the body 50, occupying at least 60% of the body volume. The body 50 and spool 52 define an internal space 56 in the valve 40 to accommodate expansion of freezing water within the spool 40.

The structure of the valve 40 minimizes the volume of water within the valve. Therefore, in the event of a temperature control problem in the refrigerator 10 which results in freezing temperatures, the mechanical forces of expansion of the small amount of water within the valve 40 are absorbed by the spool 52. The space 56 within the valve 40 also accommodates the increased volume of the freezing water within the valve 40. Thus, the freeze-tolerant valve 40 will not crack or fail in the event of freezing water within the valve.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved refrigerator, comprising:
   a water tank for storing water, and having an inlet line and an outlet line;
   a valve in the outlet line to control flow of water from the tank;
   the valve having a body and a spool within the body;
   the spool absorbing forces of expansion of freezing water in the valve to prevent failure of the valve; and
   the spool having a passage, and the spool and body defining an enlarged space communicating with the passage to accommodate expansion of freezing water in the valve.

2. The improved refrigerator of claim 1 wherein the spool substantially fills the volume of the valve body, and has a passageway extending through the spool through which water normally flows when the valve is open, whereby the spool minimizes the volume of water in the valve.

3. The improved refrigerator of claim 1 wherein the spool has an air tight seal with the body.

4. The improved refrigerator of claim 2 wherein the passage extends longitudinally through the valve.

5. The improved refrigerator of claim 2 wherein the inlet line and passage have substantially equal diameters.

6. The improved refrigerator of claim 2 wherein the space has a diameter greater than the diameter of the passage.

7. A method of preventing failure of a waterline valve in a refrigerator, comprising:
   directing water through a passage in a spool in an inlet barrel of the valve; and
   allowing water in the valve to expand during freezing into an enlarged space in the valve spool in communication with the passage without cracking the valve.

8. The method of claim 7 further comprising displacing water out of the inlet barrel of the valve with the spool.

9. The method of claim 7 wherein the spool is plastic, and further comprising absorbing the expansion forces of freezing water with the plastic spool.

10. The method of claim 7 further comprising minimizing the volume of water in the valve with the spool in the valve.

* * * * *